(12) United States Patent
He

(10) Patent No.: US 9,973,453 B2
(45) Date of Patent: May 15, 2018

(54) METHOD AND SYSTEM FOR PLAYING MULTIMEDIA FILES

(71) Applicant: Alibaba Group Holding Limited, George Town (KY)

(72) Inventor: Baigang He, Hangzhou (CN)

(73) Assignee: Alibaba Group Holding Limited (KY)

( * ) Notice: Subject to any disclaimer, the term of this patent is extended or adjusted under 35 U.S.C. 154(b) by 206 days.

(21) Appl. No.: 14/847,393

(22) Filed: Sep. 8, 2015

(65) Prior Publication Data

US 2016/0072739 A1    Mar. 10, 2016

(30) Foreign Application Priority Data

Sep. 9, 2014 (CN) .......................... 2014 1 0456785

(51) Int. Cl.
*G06F 15/16* (2006.01)
*H04L 12/58* (2006.01)
*G06F 17/30* (2006.01)

(52) U.S. Cl.
CPC ........ *H04L 51/04* (2013.01); *G06F 17/30038* (2013.01); *G06F 17/30041* (2013.01); *H04L 51/10* (2013.01)

(58) Field of Classification Search
CPC ............ G06Q 10/107; G06F 17/30017; G06F 17/30038; H04L 51/04; H04L 51/02
See application file for complete search history.

(56) References Cited

U.S. PATENT DOCUMENTS

| | | | |
|---|---|---|---|
| 8,090,779 B2 | 1/2012 | Ludwig et al. | |
| 2004/0003090 A1 | 1/2004 | Deeds | |
| 2007/0271340 A1* | 11/2007 | Goodman | G06Q 10/107 709/206 |
| 2008/0120501 A1* | 5/2008 | Jannink | G06F 17/30017 713/163 |
| 2008/0133670 A1* | 6/2008 | O'Neill | G06Q 10/107 709/206 |
| 2009/0192970 A1* | 7/2009 | O'Sullivan | H04L 51/04 706/48 |
| 2009/0193138 A1 | 7/2009 | Capps | |
| 2010/0131085 A1* | 5/2010 | Steelberg | G06Q 30/02 700/94 |
| 2014/0122627 A1* | 5/2014 | Arnold | H04L 51/02 709/206 |
| 2014/0181123 A1* | 6/2014 | Tuffet Blaise | G06F 17/30038 707/749 |

* cited by examiner

*Primary Examiner* — Dustin Nguyen
(74) *Attorney, Agent, or Firm* — Van Pelt, Yi & James LLP

(57) ABSTRACT

Playing multimedia files includes determining an instant messaging scenario type associated with an instant messaging session, locating multimedia file information that matches the scenario type, and sending the multimedia file information to at least one instant messaging terminal of a plurality of instant messaging terminals participating in the instant messaging session to trigger the at least one instant messaging terminal to play a multimedia file based on the multimedia file information.

22 Claims, 22 Drawing Sheets

1100

11000

200

3100

5100

7100

METHOD AND SYSTEM FOR PLAYING MULTIMEDIA FILES

CROSS REFERENCE TO OTHER APPLICATIONS

This application claims priority to People's Republic of China Patent Application No. 201410456785.3 entitled A METHOD AND DEVICE FOR PLAYING MULTIMEDIA FILES DURING INSTANT MESSAGING, filed Sep. 9, 2014 which is incorporated herein by reference for all purposes.

FIELD OF THE INVENTION

The present application relates to a method and a system for playing multimedia files.

BACKGROUND OF THE INVENTION

Instant messaging is an instant message exchange service based on Internet technology. When a user exchanges messages using an instant messaging application (such as QQ, MSN, Alibaba, Weixin, Laiwang, Feigechuanshu IP Messenger, etc.), in addition to using text and images, background music is often provided to set the atmosphere.

In a conventional method, if one is to play background music during an instant messaging session, the local user searches for music on the Internet, then sends a link address for the music to an external user at the opposite end of the instant messaging session. For the local user, playing the music during the instant messaging session can be performed by clicking the link address for the music, and for the external user at the opposite end of the instant messaging session to the local user, playing the music during the instant messaging session can also be performed by clicking the link address for the music sent by the local user.

A limitation of the above conventional method for playing music during the instant messaging session involves the local user performing a multi-step operation. Additionally, the external user also is to perform a click operation with respect to the link address for the music to play the background music, thus resulting in relatively low efficiency of playing background music during the instant messaging session.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
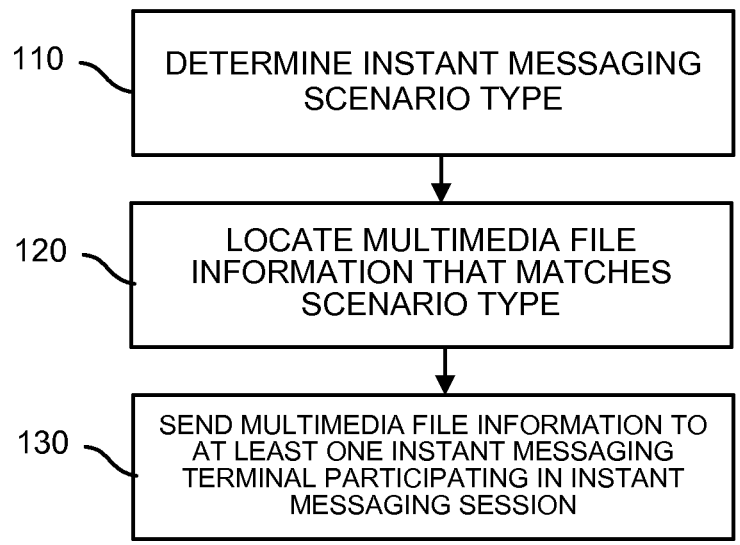
FIG. 1A is a flow chart of an embodiment of a process for playing multimedia files during an instant messaging session.

FIG. 1A is a flow chart of an embodiment of a process for playing multimedia files during an instant messaging session. In some embodiments, the process 100 is implemented by a server 810 of FIG. 8 and comprises:

In 110, the server determines an instant messaging scenario type.

In 120, the server locates multimedia file information that matches the scenario type.

In 130, the server sends the multimedia file information to at least one instant messaging terminal participating in the instant messaging session to trigger the at least one instant messaging terminal to automatically play a multimedia file based on the multimedia file information.

In some embodiments, the instant messaging scenario type indicates an atmospheric scenario into which the user experiences while participating in the instant messaging session. For example, the atmospheric scenario includes a birthday-related scenario, a wedding-related scenario, a holiday-related scenario, a scenario related to specified weather (e.g., clear, cloudy, or rainy weather) or a specified time (e.g., waking time, sleeping time), etc. In various embodiments, the specific content and quantity of the scenario types are not limited.

In some embodiments, the multimedia files that match the scenario type typically include multimedia files that are deemed to enhance the atmosphere of the scenario or strengthen the expression of emotion. Specific types of these multimedia files are not limited. For example, the multimedia files include audio files, Flash animation or video files, etc. Multimedia file information can be a link address for the multimedia file, a memory address for the multimedia file on the user terminal, etc.

For example, when the scenario type is determined to be a "birthday-related scenario," the matching audio file corresponds to the "Happy Birthday Song," when the scenario type is determined to be a "wedding-related scenario," the matching audio file corresponds to the "Wedding March," etc. In some embodiments, a mapping table of scenarios and corresponding multimedia files is stored. When a multimedia file is to be retrieved, the multimedia file is looked up in the mapping table using the specific scenario that is determined to find one or more matching multimedia files. The matching audio files can be preconfigured, and many additional examples are possible. If the number of link addresses for an audio file that matches the scenario type is greater than one, in 130, one of the link addresses for the audio file can be selected randomly and sent to the instant messaging terminal, or preset selection rules can be followed to select one of the link addresses corresponding to the audio file and send the audio file to the instant messaging terminal. In various embodiments, the audio file can be appended to the instant message being sent, or sent as a separate instant message. For example, the link address for the audio file that has the highest volume of click traffic among multiple audio files can be selected and sent to the instant messaging terminal. In another example, based on geographical locations of the instant messaging terminals, an audio file having a relatively high level of popularity (e.g., the number of clicks during a time period exceeds a threshold) within an area in which the instant messaging terminals are found to be located can be selected and sent to the instant messaging terminals.

Figure 1B:
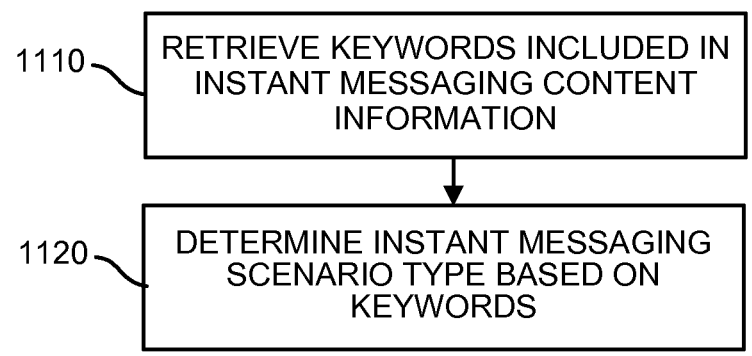
FIG. 1B is a flow chart of an embodiment of a process for determining an instant messaging scenario type.

FIG. 1B is a flow chart of an embodiment of a process for determining an instant messaging scenario type. In some embodiments, the process 1100 is an implementation of operation 110 of FIG. 1A and comprises:

In 1110, the server retrieves keywords included in instant messaging content information. In some embodiments, stop words such as "a," "the," etc. are filtered, and the remaining words are used as keywords. In some embodiments, a keyword dictionary is used, and those words found in the keyword dictionary are used as keywords.

In 1120, the server determines an instant messaging scenario type based on the keywords.

In some embodiments, the keywords refer to characters or words included in the instant messaging content information that are able to sum up emotion. For example, the characters or words include "wedding," "birthday," "Christmas," "Chinese New Year," etc. A keyword library relating to different scenario types can be established in a database. In some embodiments, the keyword library includes keywords in multiple languages. For example, when the server detects that the instant messaging content information includes keywords such as "生日 [birthday in Chinese]" or "birthday," by searching the keyword library, the server can determine that the instant messaging scenario type relates to a "birthday-related scenario."

In some embodiments, a determination of the instant messaging scenario type based on the keywords includes: determining the instant messaging scenario type based on the keywords in the event that the keywords satisfy preset conditions. In some embodiments, the preset conditions based on the keywords include: a number of times the keywords appear in the instant messaging content information is greater than a preset number of times, a specific combination of the keywords and specified characters appears in the instant messaging information, and/or any other appropriate precondition.

For example, when the server determines, based on monitoring, that the number of times the keywords "heavy rain" appear in the instant messaging information is greater than two, the server can determine that the instant messaging scenario type is a "rainy weather-related scenario." In another example, when the server determines, based on monitoring, that the instant messaging content information includes combinations that strongly express the scenario information, such as "rain" and "very heavy," or "rain" and "extremely heavy," the server determines that the instant messaging scenario type corresponds to a "rainy weather-related scenario."

In some embodiments, the keywords can be extracted by an executing agent on the server in operation 110 from the instant messaging content information sent by any of the instant messaging terminals participating in the instant messaging session. In some embodiments, the retrieval of the keywords included in the instant messaging content information comprises: retrieving instant messaging content information sent by one of the instant messaging terminals participating in the instant messaging session, and extracting the keywords from the instant messaging content information.

In some embodiments, the keywords also are extracted by one of the instant messaging terminals participating in the instant messaging session from the instant messaging content information and sent to the executing agent in operation 110. In some embodiments, the retrieval of the keywords included in the instant messaging content information comprises retrieving keywords included in the instant messaging content information sent by one of the instant messaging terminals participating in the instant messaging session.

Figure 1C:
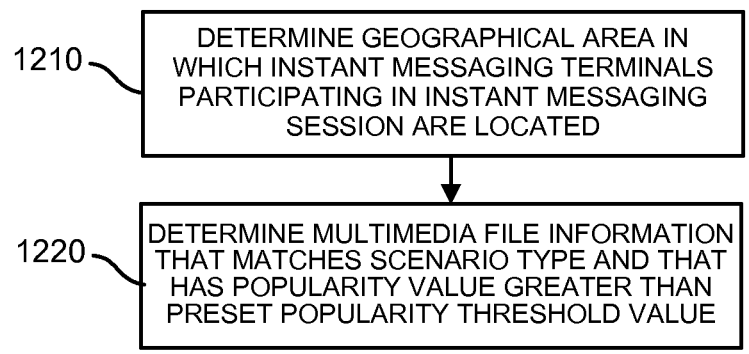
FIG. 1C is a flow chart of an embodiment of a process for locating multimedia file information that matches a scenario type.

FIG. 1C is a flow chart of an embodiment of a process for locating multimedia file information that matches a scenario type. In some embodiments, the process 1200 is an implementation of operation 120 of FIG. 1A and comprises:

In 1210, the server determines a geographical area in which instant messaging terminals participating in an instant messaging session are located based on geographical locations of the instant messaging terminals participating in the instant messaging session. In some embodiments, the geographical areas of the instant messaging terminals are determined based on location information included in an instant message. In some embodiments, the location information of an instant messaging terminal is determined based on a global positioning system (GPS) component, a location-based service (LBS) component, etc. included in the instant messaging terminal.

In 1220, the server, based on the geographical area, determines multimedia file information that matches the scenario type and that has a popularity value greater than a preset popularity threshold value.

In some embodiments, the popularity value of multimedia files corresponds to a click-to-play volume, a download volume of the multimedia files, etc. A determined multimedia file corresponds to a multimedia file that matches the scenario type and for which the click-to-play volume or download volume is relatively high. For example, instant messaging terminal A and instant messaging terminal B coexist in the same office area, and multimedia files that match the scenario type can be selected from among songs for which click traffic by employees in the office area is relatively high. Selecting a multimedia file having a relatively high popularity value in a geographical area in which the terminals coexist and sending the multimedia file to the instant messaging terminals can provide instant messaging users an experience that is more personal and provides more satisfaction.

Figure 1D:
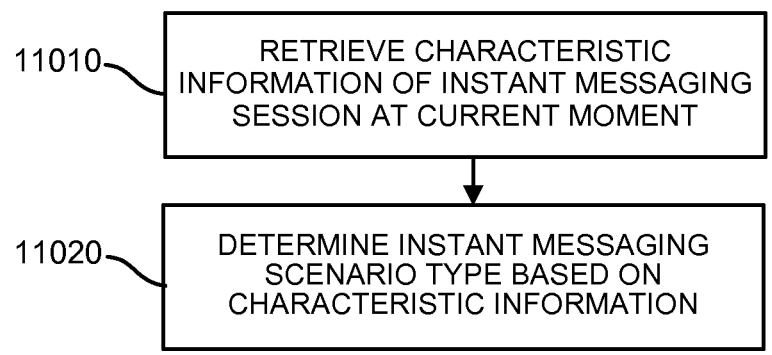
FIG. 1D is a flow chart of another embodiment of a process for determining an instant messaging scenario type.

FIG. 1D is a flow chart of another embodiment of a process for determining an instant messaging scenario type. In some embodiments, the process 11000 is another implementation of operation 110 of FIG. 1A and comprises:

In 11010, the server retrieves characteristic information of the instant messaging session at the current moment. In some embodiments, the characteristic information of the instant messaging session at the current moment includes time information, weather information, or breaking news information of the instant messaging session at the current moment.

In 11020, the server determines an instant messaging scenario type based on the characteristic information of the instant messaging session at the current moment.

For example, the server retrieves time information of an instant messaging session at the current moment. Instant messages typically include timestamps in their headers. During the instant message session, the server receives an instant message, and obtains the timestamp information in the header. If the current moment occurs during the period from 10 pm to 12 am in the evening, then the instant messaging scenario type is determined to be a "scenario related to preparing to go to sleep," and an audio file that matches the determined scenario type can be "Cradle Song," "Nocturne," etc. In another example, the server retrieves a weather information of the instant messaging session at the current moment (in this case, the weather information of a geographical location in which each of the various instant messaging terminals participating in the instant messaging session coexist is the same) from, for example, a weather service website using an application programming interface (API) provided by the weather service website. If the weather information indicates that it is raining at the current moment, then the server can determine based on the weather information that the instant messaging scenario type is a "rainy weather-related scenario," and an audio file that matches this scenario type can correspond to songs such as "Rainy Day," "Rainbow," etc. In yet another example, the server retrieves breaking news information of the instant messaging session at the current moment. If the current moment occurs during the World Cup, then the server can determine based on the breaking news information that the instant messaging scenario type corresponds to a "World Cup-related scenario," and an audio file that matches the scenario type can be the "World Cup Theme Song."

In various embodiments, one of process 1100 of FIG. 1B and process 11000 of FIG. 1D can be arbitrarily selected for determining an instant messaging scenario type, or used in accordance with a predefined priority sequence. For example, if priority is given to the performance of the process 11000 of FIG. 1D, the instant messaging scenario type is determined based on the characteristic information of the instant messaging at the current moment. If keywords corresponding to a certain scenario type are detected in the instant messaging content information, then the scenario type is determined based on the keywords.

Because the instant messaging terminals participating in the instant messaging session can automatically play multimedia files that match the scenario type (e.g., the instant messaging application executing on an instant messaging terminal is automatically triggered to play the multimedia file upon receiving an instant message that includes a link to a multimedia file), in comparison to the conventional process, users using the instant messaging terminals engaging in the instant messaging session do not need to perform related search and play operations, therefore, the process 100 of FIG. 1A reduces network traffic and increases the efficiency of playing multimedia files during an instant messaging session.

Additionally, triggering the playing of multimedia files without the user triggering the playing of the multimedia files consciously enhances and adjusts the atmosphere, and strengthens the expression of emotions. The multimedia files automatically played by each of the various instant messaging terminals are the same, which gives the instant messaging users an experience that is more personal and provides more satisfaction.

Please note that the executing agent of each operation of the process 100 can be performed by the same piece of equipment, or different pieces of equipment can serve as the executing agent of each operation of the process 100. For example, the executing agent of operations 110 and 120 is server A, and the executing agent of operation 130 is server B. In another example, the executing agent for operation 110 is server A, and the executing agent for operations 120 and 130 is server B.

Figure 2:
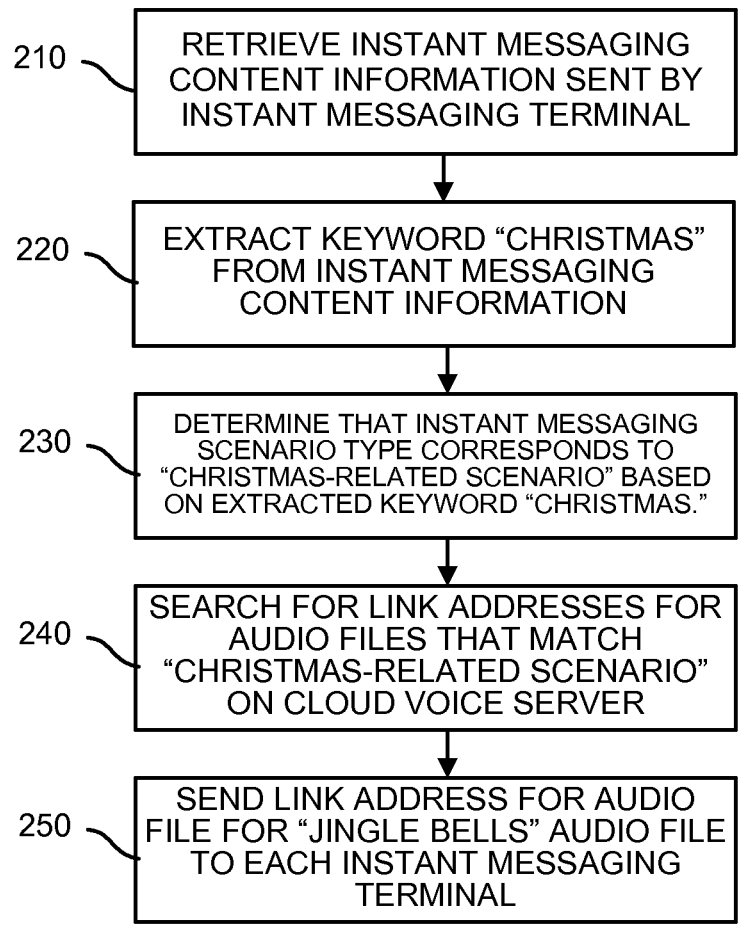
FIG. 2 is a flow chart of another embodiment of a process for playing multimedia files during an instant messaging session.

FIG. 2 is a flow chart of another embodiment of a process for playing multimedia files during an instant messaging session. In some embodiments, the process 200 is implemented by a server 810 of FIG. 8 and comprises:

In 210, the server retrieves instant messaging content information sent by an instant messaging terminal. For example, the instant messaging content information includes "Merry Christmas."

In 220, the server extracts a keyword "Christmas" from the instant messaging content information.

In 230, the server determines that an instant messaging scenario type corresponds to a "Christmas-related scenario" based on the extracted keyword "Christmas."

In 240, the server searches for link addresses for audio files that match the "Christmas-related scenario" on a cloud voice server. For example, the server searches for and finds a link address for a "Jingle Bells" audio file.

In 250, the server sends a link address for the audio file for the "Jingle Bells" audio file to each instant messaging terminal participating in the instant messaging session to trigger the each instant messaging terminal to automatically play the audio file based on the audio file link address.

When a user participating in the instant messaging session uses the instant messaging terminal to send a Christmas greeting message, each of the instant messaging terminals participating in the instant messaging session is configured to automatically play the song "Jingle Bells." The process 200 increases the efficiency of playing audio files during instant messaging sessions, and is able to pleasantly surprise the users, enhance and adjust the atmosphere, and strengthen the expression of emotions.

Figure 3A:
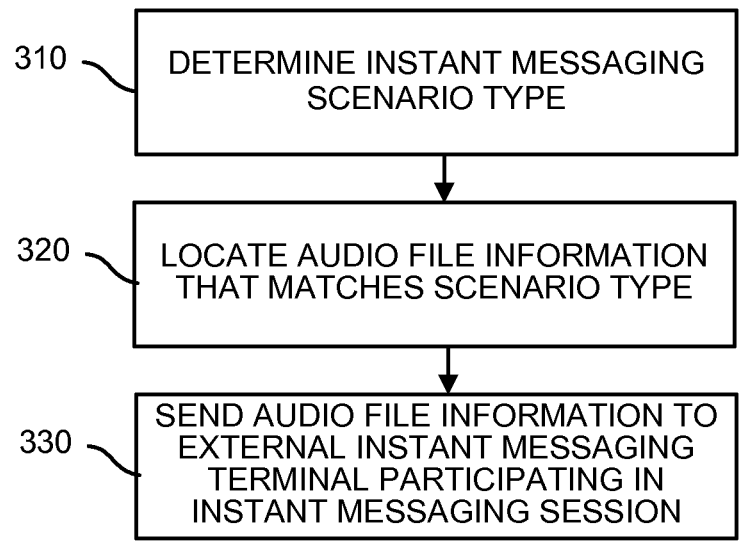
FIG. 3A is a flow chart of yet another embodiment of a process for playing multimedia files during an instant messaging session.

FIG. 3A is a flow chart of yet another embodiment of a process for playing multimedia files during an instant messaging session. In some embodiments, the process 300 is implemented by a client 820 or 830 of FIG. 8 and comprises:

In 310, the client or instant messaging terminal determines an instant messaging scenario type.

In 320, the client locates audio file information that matches the scenario type.

In 330, the client sends the audio file information to an external instant messaging terminal participating in the instant messaging session to trigger the external instant messaging terminal to automatically play an audio file based on the audio file information. In some embodiments, the client sends the audio file information to the external instant messaging terminal participating in the instant messaging session via a server. In some embodiments, the external instant messaging terminal is triggered to automatically play the audio file based on audio file information received from the server.

A difference between process 100 of FIG. 1A or process 200 of FIG. 2, and process 300 is that in process 300 the executing agent is installed on the client (instant messaging terminal) and thus performs all of the operations on the client or instant messaging terminal.

Similarly, the audio file information can be a link address (e.g., a universal resource locator (URL)) for the audio file, or a storage address (e.g., a file directory path) of the audio file on the user's instant messaging terminal, etc.

After operation 320, process 300 further comprises: automatically playing the audio file based on the audio file information. This operation can be performed concurrently with operation 330, or the operation can be executed before or after operation 330. In some embodiments, the audio file automatically played by each instant messaging terminal is the same in the same session, thus offering the instant messaging users a shared experience that is more personal.

Figure 3B:
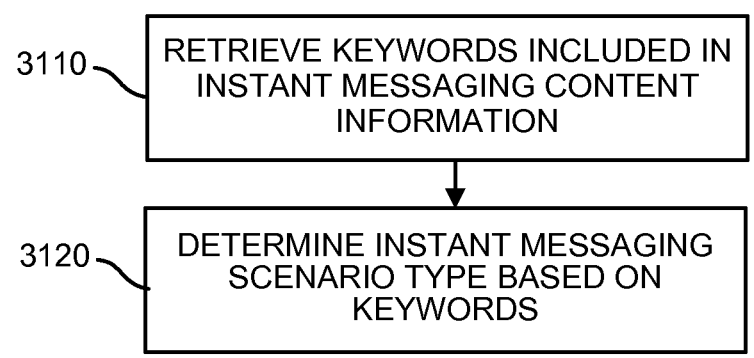
FIG. 3B is a flow chart of another embodiment of a process for determining an instant messaging scenario type.

FIG. 3B is a flow chart of another embodiment of a process for determining an instant messaging scenario type. In some embodiments, the process 3100 is an implementation of operation 310 of FIG. 3A and comprises:

In 3110, the client retrieves keywords included in the instant messaging content information. In some embodiments, techniques described above in connection with operation 1110 of FIG. 1B are used.

In 3120, the client determines the instant messaging scenario type based on the keywords.

Figure 3C:
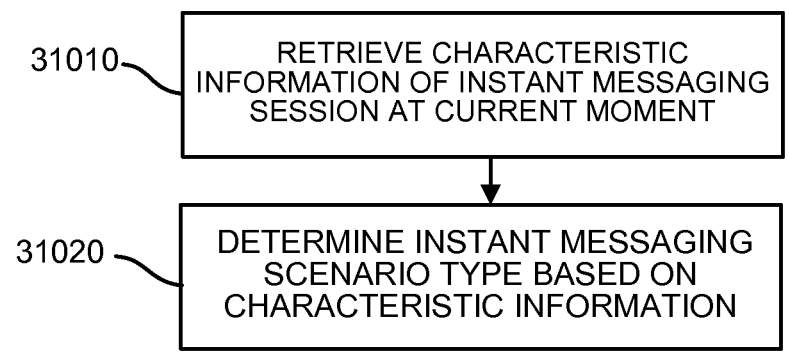
FIG. 3C is a flow chart of yet another embodiment of a process for determining an instant messaging scenario type.

FIG. 3C is a flow chart of yet another embodiment of a process for determining an instant messaging scenario type. In some embodiments, the process 31000 is another implementation of operation 310 of FIG. 3A and comprises:

In 31010, the client retrieves characteristic information of an instant messaging session at the current moment. In some embodiments, the characteristic information of the instant messaging session at the current moment includes time information, weather information, or breaking news information of the instant messaging session at the current moment. Techniques similar to operation 11010 of FIG. 1D described above can be used.

In 31020, the client determines an instant messaging scenario type based on the characteristic information of the instant messaging session at the current moment.

Because the instant messaging terminals participating in the instant messaging session can automatically play multimedia files that match the scenario type, in comparison to the conventional process, users using the instant messaging terminals to engage in the instant messaging session do not need to perform related search and play operations. Therefore, the process 300 greatly increases the efficiency of playing multimedia files during the instant messaging session.

Figure 4A:
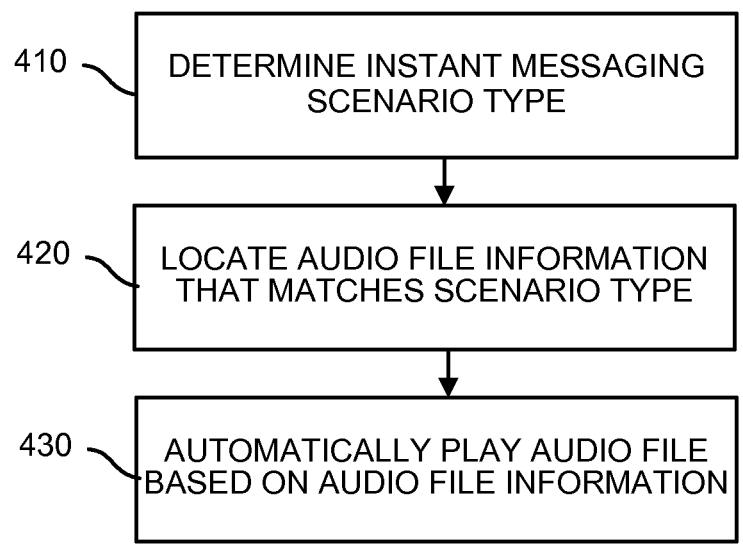
FIG. 4A is a flow chart of yet another embodiment of a process for playing multimedia files during an instant messaging session.

FIG. 4A is a flow chart of yet another embodiment of a process for playing multimedia files during an instant messaging session. In some embodiments, the process 400 is implemented by a client 820 or 830 of FIG. 8 and comprises:

In 410, the client or instant messaging terminal determines an instant messaging scenario type.

In 420, the client locates audio file information that matches the scenario type.

In 430, the client automatically plays an audio file based on the audio file information.

In some embodiments, the executing agent of all of the operations of process 400 is installed on an instant messaging terminal or client.

Similarly, the audio file information can be a link address for the audio file, or a storage address for the audio file on the user's terminal, etc.

Figure 4B:
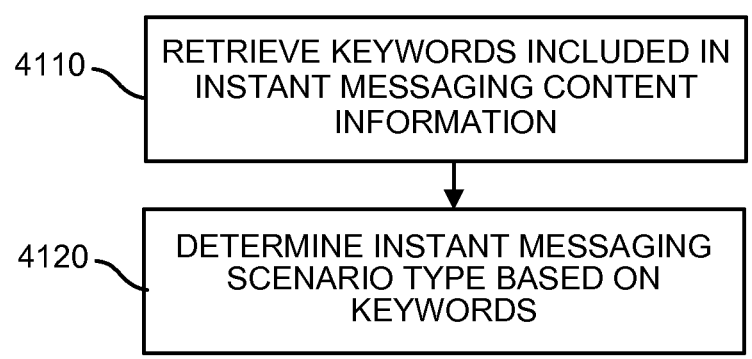
FIG. 4B is a flow chart of another embodiment of a process for determining an instant messaging scenario type.

FIG. 4B is a flow chart of another embodiment of a process for determining an instant messaging scenario type. In some embodiments, the process 4100 is an implementation of operation 410 of FIG. 4A and comprises:

In 4110, the client retrieves keywords included in instant messaging content information. The techniques discussed above can be used to facilitate the keywords retrieval.

In 4120, the client determines an instant messaging scenario type based on the keywords.

Figure 4C:
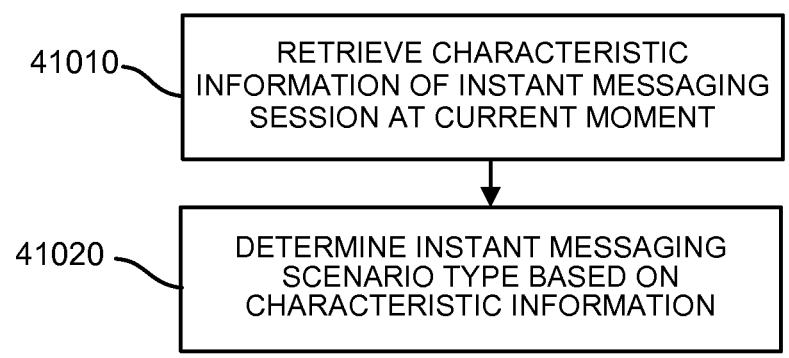
FIG. 4C is a flow chart of yet another embodiment of a process for determining an instant messaging scenario type.

FIG. 4C is a flow chart of yet another embodiment of a process for determining an instant messaging scenario type. In some embodiments, the process 41000 is another implementation of operation 410 of FIG. 4A and comprises:

In 41010, the client retrieves characteristic information of the instant messaging session at the current moment. In some embodiments, the characteristic information of the instant messaging session at the current moment comprises time information, weather information, or breaking news information of the instant messaging session at the current moment.

In 41020, the client determines the instant messaging scenario type based on the characteristic information of the instant messaging session at the current moment.

In some embodiments, the audio files automatically played by each instant messaging terminal can be the same.

In some embodiments, the audio files automatically played by each instant messaging terminal can be different.

If the instant messaging scenario type is determined based on the keywords included in the instant messaging content information, then the scenario type is the same for each instant messaging terminal, and each instant messaging terminal can play the same audio file, or the instant messaging terminals can play different audio files for the same scenario type. For example, if the instant messaging content information includes a phrase such as "it's raining outside and very cold," based on the keywords "raining" and "cold" included in the phrase, each instant messaging terminal participating in the instant messaging session can search for audio files that match the scenario type (e.g., one or more audio files that are preconfigured to map to "raining" and/or "cold") and automatically play the audio files.

If the instant messaging scenario type is determined based on the characteristic information of the instant messaging session at the current moment, the scenario type for each instant messaging terminal can be different. For example, if it is raining in an area in which instant messaging terminal A is located, then instant messaging terminal A determines that the instant messaging scenario type is a "rainy weather-related scenario," and automatically plays an audio file that matches the "rainy weather-related scenario." But if the weather in an area in which instant messaging terminal B is located is clear, then instant messaging terminal B determines that the instant messaging scenario type is a "clear weather-related scenario," and automatically plays an audio file that matches the "clear weather-related scenario."

Because the instant messaging terminals participating in the instant messaging session can automatically play audio files that match the scenario type, in comparison to the conventional process, users using instant messaging terminals to engage in an instant messaging session do not need to perform related search and play operations, therefore, the process 400 of FIG. 4A greatly increases the efficiency of playing multimedia files during the instant messaging session.

Figure 5A:
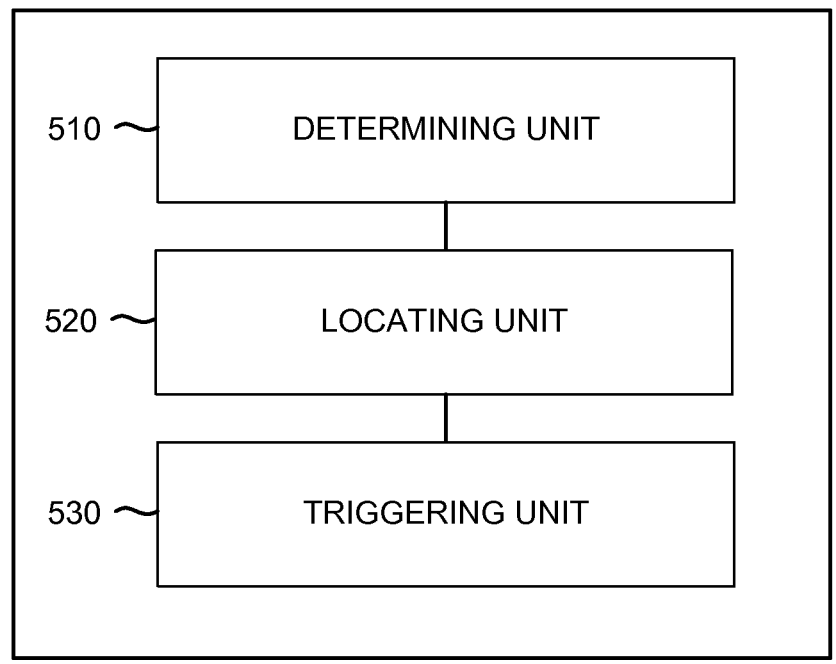
FIG. 5A is a structural schematic diagram of an embodiment of a device for playing multimedia files during an instant messaging session.

FIG. 5A is a structural schematic diagram of an embodiment of a device for playing multimedia files during an instant messaging session. In some embodiments, the device 500 is configured to perform process 100 of FIG. 1A or process 200 of FIG. 2 and comprises: a determining unit 510, a locating unit 520, and a triggering unit 530.

In some embodiments, the determining unit 510 is configured to determine an instant messaging scenario type.

In some embodiments, the locating unit 520 is configured to locate multimedia file information that matches the scenario type. In some embodiments, based on the instant messaging scenario type, the locating unit 520 will locate the corresponding multimedia file information, e.g., an audio file, via a mapping table. For example, the mapping table includes various links to multimedia files corresponding to various scenario types.

In some embodiments, the triggering unit 530 is configured to send the multimedia file information to at least one instant messaging terminal participating in an instant messaging session to trigger the at least one instant messaging terminal to automatically play a multimedia file based on the multimedia file information.

Figure 5B:
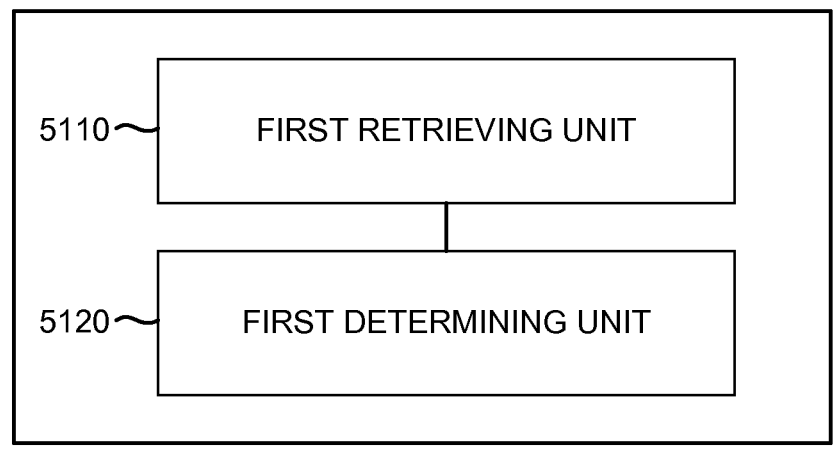
FIG. 5B is a structural schematic diagram of an embodiment of a determining unit.

FIG. 5B is a structural schematic diagram of an embodiment of a determining unit. In some embodiments, the determining unit 5100 is an implementation of the determining unit 510 of FIG. 5A and comprises: a first retrieving unit 5110 and a first determining unit 5120.

In some embodiments, the first retrieving unit 5110 is configured to retrieve keywords included in instant messaging content information.

In some embodiments, the first determining unit 5120 is configured to determine an instant messaging scenario type based on the keywords.

In some embodiments, the first retrieving unit 5110 is configured to retrieve the instant messaging content information sent by any instant messaging terminal participating in the instant messaging session and extract the keywords based on the instant messaging content information. The first retrieving unit 5110 is also configured to retrieve keywords included in the instant messaging content information sent by any instant messaging terminal participating in the instant messaging session.

In some embodiments, the first determining unit 5120 is configured to, when the keywords satisfy preset conditions, determine the instant messaging scenario type based on the keywords. In some embodiments, the satisfaction of the preset conditions based on the keywords comprises: a number of times the keywords appear in the instant messaging content information is greater than a preset number of times, or a combination of the keywords and specified characters appears in the instant messaging information.

Figure 5C:
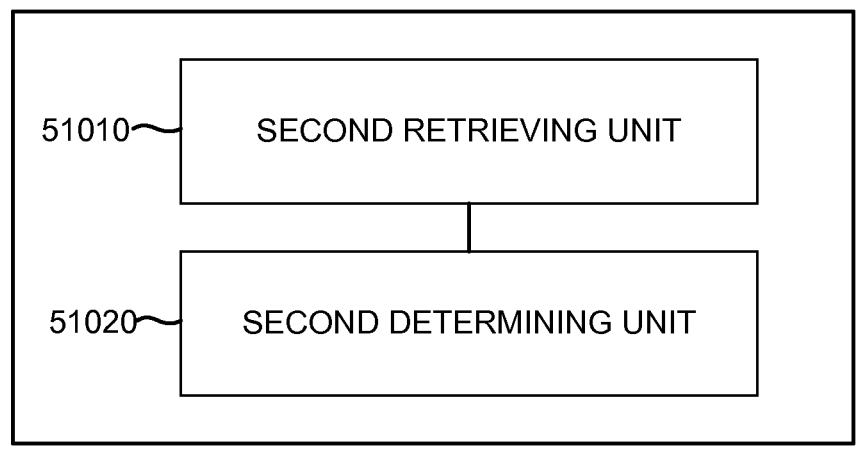
FIG. 5C is a structural schematic diagram of another embodiment of a determining unit.

FIG. 5C is a structural schematic diagram of another embodiment of a determining unit. In some embodiments, the determining unit 51000 is another implementation of the determining unit 510 of FIG. 5A and comprises: a second retrieving unit 51010 and a second determining unit 51020.

In some embodiments, the second retrieving unit 51010 is configured to retrieve characteristic information of an instant messaging session at the current moment. In some embodiments, the characteristic information of the instant messaging session at the current moment includes a time information, weather information, or breaking news information of the instant messaging session at the current moment.

In some embodiments, the second determining unit 51020 is configured to determine the instant messaging scenario type based on the characteristic information of the instant messaging session at the current moment.

In some embodiments, the locating unit 520 of FIG. 5A is further configured to determine a geographical area in which the instant messaging terminals participating in the instant messaging session are located based on geographical locations of the instant messaging terminals participating in the instant messaging session, and based on the geographical area, determine multimedia file information that matches the scenario type and that has a popularity value greater than a preset popularity threshold value.

Similar to process 100 of FIG. 1A or process 200 of FIG. 2, device 500 of FIG. 5A, because the instant messaging terminals participating in the instant messaging session can automatically play multimedia files that match the scenario type, greatly increases the efficiency of playing multimedia files during an instant messaging session.

Figure 6A:
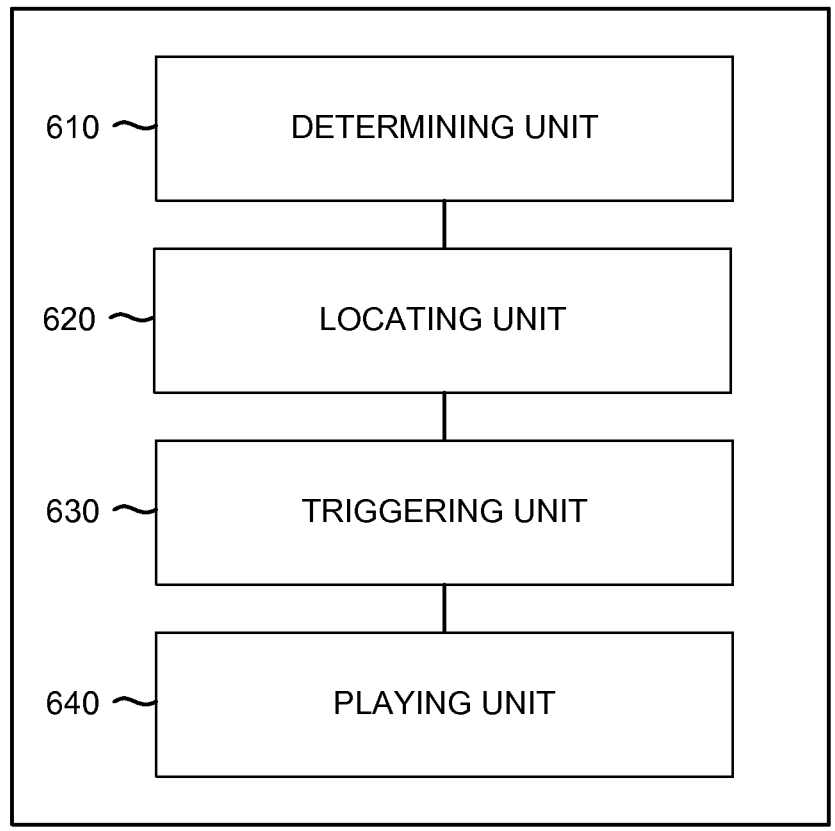
FIG. 6A is a structural schematic diagram of another embodiment of a device for playing multimedia files during an instant messaging session.

FIG. 6A is a structural schematic diagram of another embodiment of a device for playing multimedia files during an instant messaging session. In some embodiments, the device 600 is configured to perform the process 300 of FIG. 3A and comprises: a determining unit 610, a locating unit 620, and a triggering unit 630.

In some embodiments, the determining unit 610 is configured to determine an instant messaging scenario type.

In some embodiments, the locating unit 620 is configured to locate audio file information that matches the scenario type.

In some embodiments, the triggering unit 630 is configured to send the audio file information to an external instant messaging terminal at the opposite end participating in the instant messaging session to trigger the external instant messaging terminal at the opposite end to automatically play an audio file based on the audio file information.

In some embodiments, this device 600 further includes a playing unit 640.

In some embodiments, the playing unit 640 is configured to automatically play the audio file based on the audio file information.

Figure 6B:
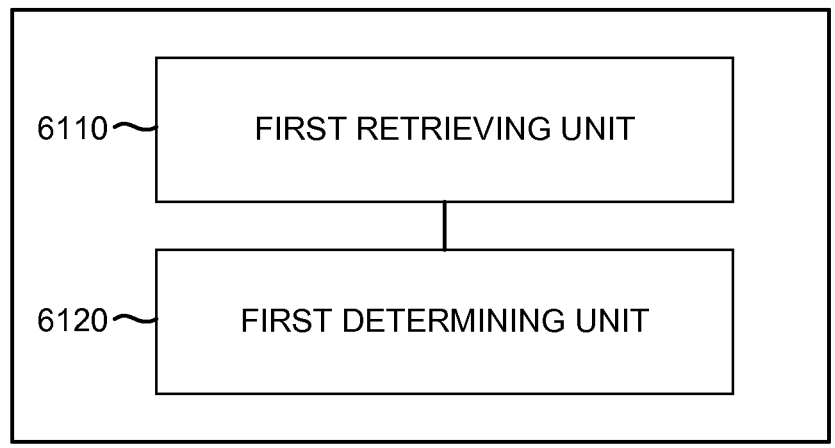
FIG. 6B is a structural schematic diagram of another embodiment of a determining unit.

FIG. 6B is a structural schematic diagram of another embodiment of a determining unit. In some embodiments, the determining unit 6100 is an implementation of the determining unit 610 of FIG. 6A and comprises: a first retrieving unit 6110 and a first determining unit 6120.

In some embodiments, the first retrieving unit 6110 is configured to retrieve keywords included in instant messaging content information.

In some embodiments, the first determining unit 6120 is configured to determine an instant messaging scenario type based on the keywords.

Figure 6C:
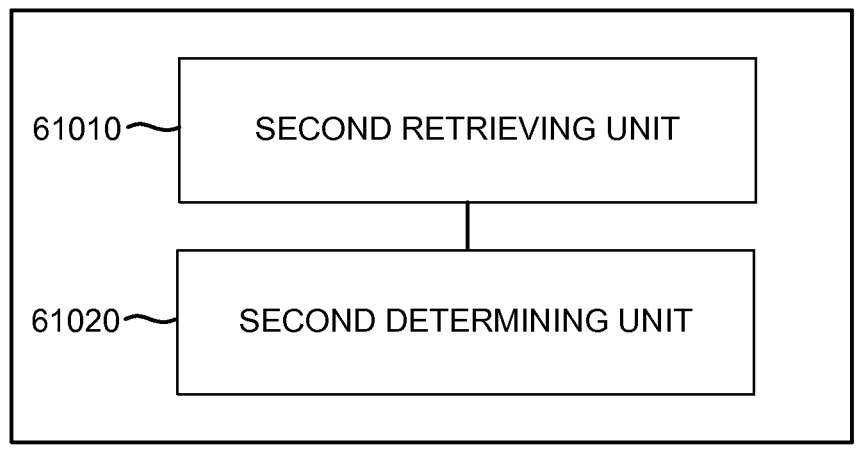
FIG. 6C is a structural schematic diagram of another embodiment of a determining unit.

FIG. 6C is a structural schematic diagram of another embodiment of a determining unit. In some embodiments, the determining unit 61000 is another implementation of the determining unit 610 of FIG. 6A and comprises: a second retrieving unit 61010 and a second determining unit 61020.

In some embodiments, the second retrieving unit 61010 is configured to retrieve characteristic information of an instant messaging session at the current moment. In some embodiments, the characteristic information of the instant messaging session at the current moment includes time information, weather information, or breaking news information of the instant messaging session at the current moment.

In some embodiments, the second determining unit 61020 is configured to determine an instant messaging scenario type based on the characteristic information of the instant messaging session at the current moment.

Similar to process 300 of FIG. 3A, the device 600, because the instant messaging terminals participating in an instant messaging session are able to automatically play audio files that match the scenario type, greatly increases the efficiency of playing audio files during the instant messaging session.

Figure 7A:
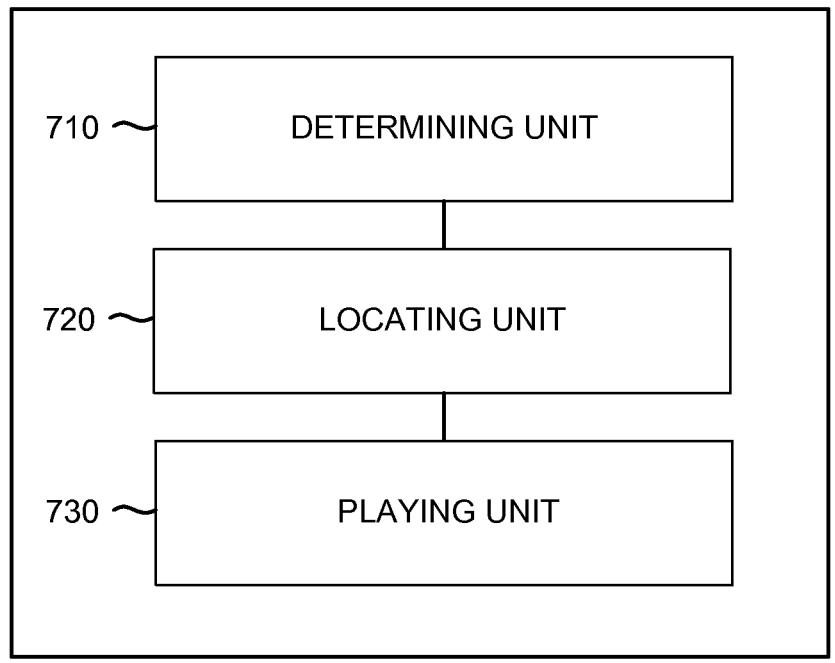
FIG. 7A is a structural schematic diagram of yet another embodiment of a device for playing multimedia files during an instant messaging session.

FIG. 7A is a structural schematic diagram of yet another embodiment of a device for playing multimedia files during an instant messaging session. In some embodiments, the device 700 is configured to perform process 400 of FIG. 4A and comprises: a determining unit 710, a locating unit 720, and a playing unit 730.

In some embodiments, the determining unit 710 is configured to determine an instant messaging scenario type.

In some embodiments, the locating unit 720 is configured to locate audio file information that matches the scenario type.

In some embodiments, the playing unit 730 is configured to automatically play an audio file based on the audio file information.

Figure 7B:
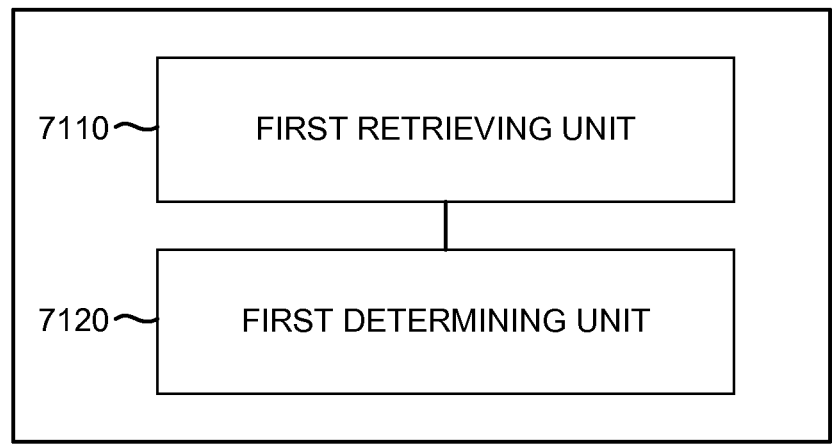
FIG. 7B is a structural schematic diagram of another embodiment of a determining unit.

FIG. 7B is a structural schematic diagram of another embodiment of a determining unit. In some embodiments, the determining unit 7100 is an implementation of the determining unit 710 of FIG. 7A and comprises: a first retrieving unit 7110 and a first determining unit 7120.

In some embodiments, the first retrieving unit 7110 is configured to retrieve keywords included in an instant messaging content information.

In some embodiments, the first determining unit 7120 is configured to determine the instant messaging scenario type based on the keywords.

Figure 7C:
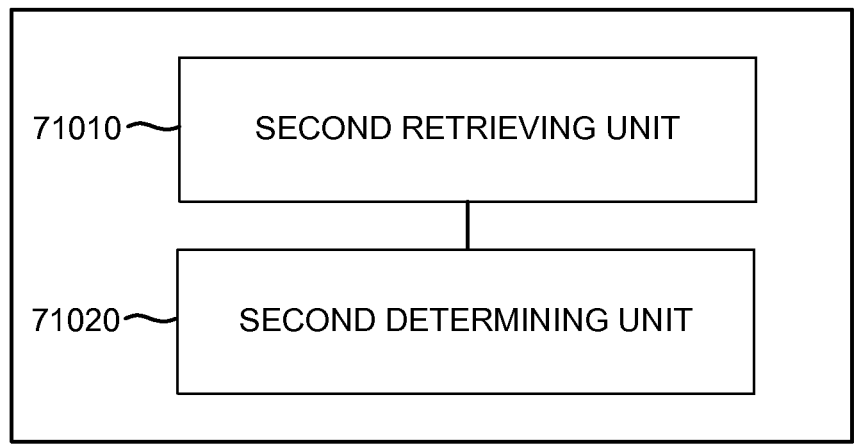
FIG. 7C is a structural schematic diagram of another embodiment of a determining unit.

FIG. 7C is a structural schematic diagram of another embodiment of a determining unit. In some embodiments, the determining unit 71000 is another implementation of the determining unit 710 of FIG. 7A and comprises: a second retrieving unit 71010 and a second determining unit 71020.

In some embodiments, the second retrieving unit 71010 is configured to retrieve characteristic information of an instant messaging session at the current moment. In some embodiments, the characteristic information of the instant messaging session at the current moment includes time information, weather information, or breaking news information of the instant messaging session at the current moment.

In some embodiments, the second determining unit 71020 is configured to determine an instant messaging scenario type based on the characteristic information of the instant messaging session at the current moment.

Similar to process 400 of FIG. 4A, device 700 of FIG. 7A, because the instant messaging terminals participating in the instant messaging session are able to automatically play audio files that match the scenario type, greatly increases the efficiency of playing audio files during instant messaging sessions.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 8:
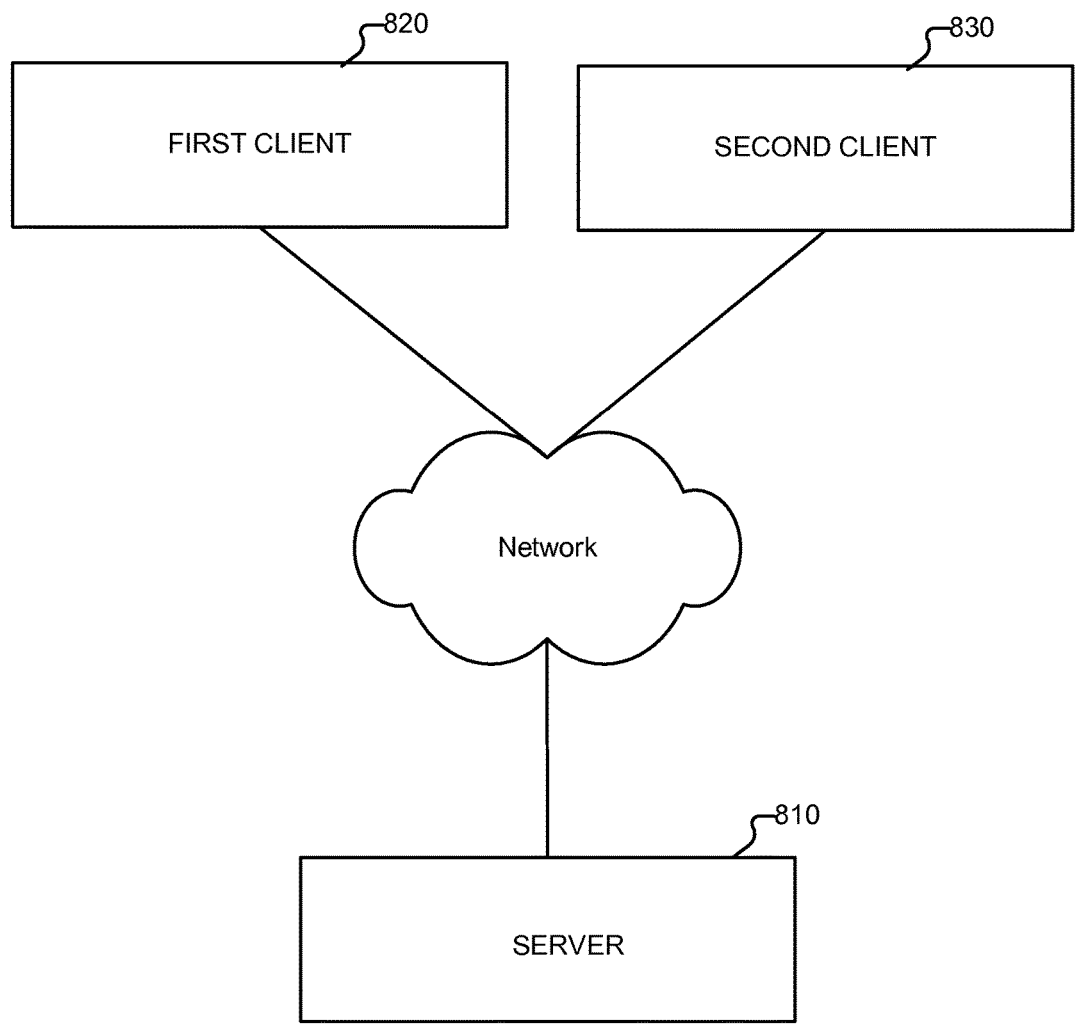
FIG. 8 is a diagram of an embodiment of a system for playing multimedia files during an instant messaging session.

FIG. 8 is a diagram of an embodiment of a system for playing multimedia files during an instant messaging session. In some embodiments, the system 800 is configured to perform process 100 of FIG. 1A, process 200 of FIG. 2, process 300 of FIG. 3A, or process 400 of FIG. 4A and comprises: a server 810, a first client 820, and a second client 830.

In some embodiments, the server 810 determines an instant messaging scenario type, locates multimedia file information that matches the scenario type, and sends the multimedia file information to at least one client of the first client 820 and the second client 830 participating in an instant messaging session to trigger the at least one client to automatically play a multimedia file based on the multimedia file information.

In some embodiments, the first client 820 and the second client 830 correspond to personal computers (PCs), mobile devices, etc.

Figure 9:
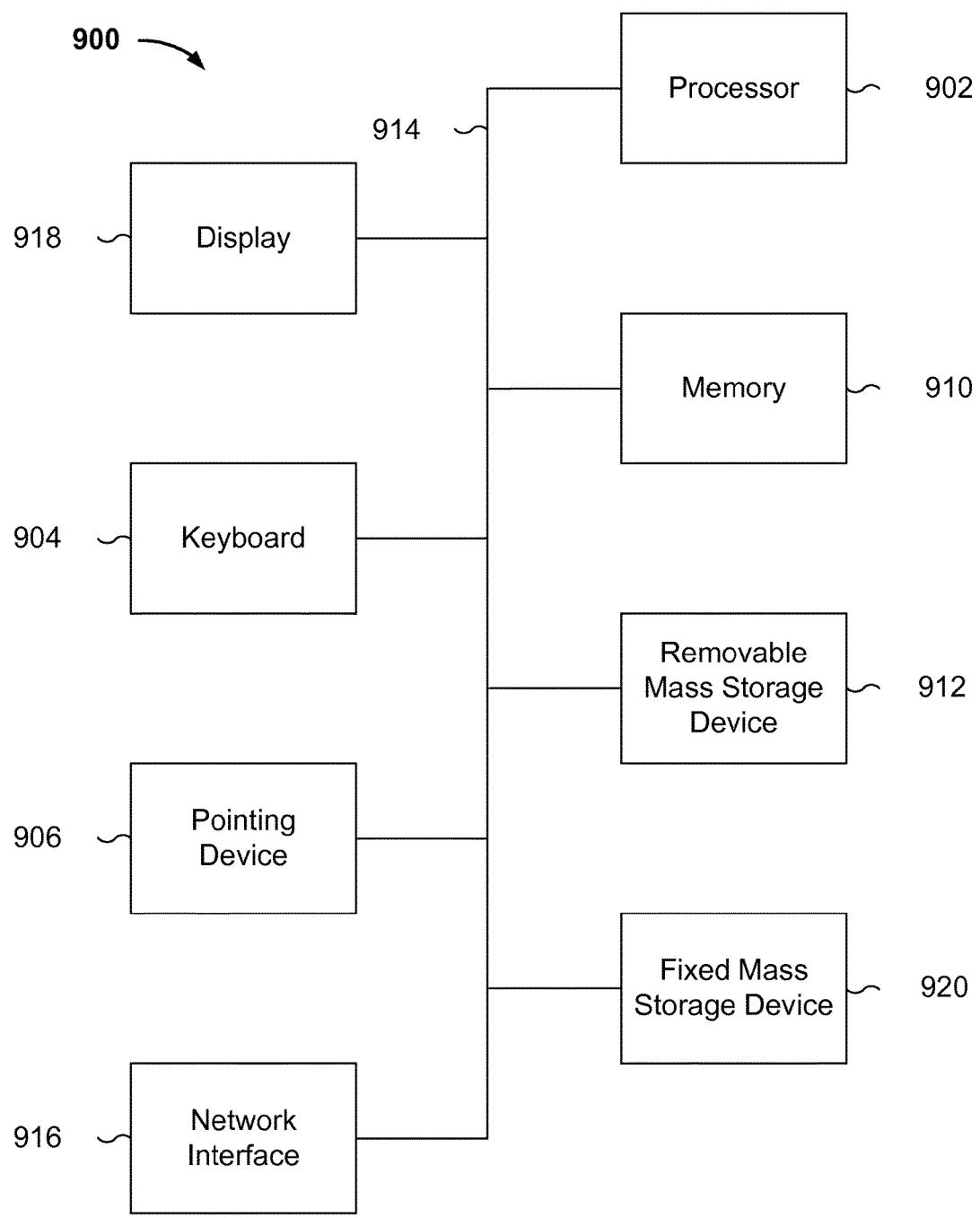
FIG. 9 is a functional diagram illustrating an embodiment of a programmed computer system for playing multimedia files during an instant messaging session.

FIG. 9 is a functional diagram illustrating an embodiment of a programmed computer system for playing multimedia files during an instant messaging session. As will be apparent, other computer system architectures and configurations can be used for playing multimedia files during an instant messaging session. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In some embodiments, processor 902 includes and/or is used to perform the processes described above with respect to FIGS. 1A, 2, 3A, and 4A.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining an instant messaging scenario type associated with an instant messaging session;
   locating multimedia file information that matches the scenario type, comprising:
      determining a geographical area in which a first instant messaging terminal and a second instant messaging terminal participating in the instant messaging session are located, the determination being based at least in part on a first geographical location of the first instant messaging terminal and a second geographical location of the second instant messaging terminal participating in the instant messaging session; and
      determining the multimedia file information that matches the scenario type and has a popularity value greater than a preset popularity threshold value that corresponds to a preset threshold number of people in the geographical area; and
   sending the multimedia file information to at least one instant messaging terminal of a plurality of instant messaging terminals participating in the instant messaging session to trigger the at least one instant messaging terminal to play a multimedia file based on the multimedia file information, the plurality of instant messaging terminals including the first instant messaging terminal and the second instant messaging terminal.

2. The method as described in claim 1, wherein the determining of the instant messaging scenario type comprises:
   retrieving keywords included in instant messaging content information; and
   determining the instant messaging scenario type based on the keywords.

3. The method as described in claim 2, wherein the retrieving of the keywords included in the instant messaging content information comprises:
   retrieving the instant messaging content information sent by an instant messaging terminal participating in the instant messaging session; and
   extracting the keywords based on the instant messaging content information.

4. The method as described in claim 2, wherein the retrieving of the keywords included in the instant messaging content information comprises:
   retrieving the keywords included in the instant messaging content information sent by an instant messaging terminal participating in the instant messaging session.

5. The method as described in claim 2, wherein the determining of the instant messaging scenario type based on the keywords comprises:
   determining the instant messaging scenario type based on the keywords in response to a determination that the keywords satisfy preset conditions, wherein the preset conditions comprise:
   a number of times the keywords appear in the instant messaging content information being greater than a preset number of times; or
   a combination of keywords and specified characters appears in the instant messaging content information.

6. The method as described in claim 1, wherein the determining of the instant messaging scenario type comprises:
   retrieving characteristic information of the instant messaging session at the current moment, the characteristic information of the instant messaging session at the current moment includes time information, weather information, or breaking news information of the instant messaging session at the current moment; and
   determining the instant messaging scenario type based on the characteristic information of the instant messaging session at the current moment.

7. A method, comprising:
   determining an instant messaging scenario type;
   locating audio file information that matches the scenario type, comprising:
      determining a geographical area in which a local instant messaging terminal and an external instant messaging terminal participating in the instant messaging session are located, the determination being based at least in part on a first geographical location of the local instant messaging terminal and a second geographical location of the external instant messaging terminal participating in the instant messaging session; and
      determining the audio file information that matches the scenario type and has a popularity value greater than a preset popularity threshold value that corresponds to a preset threshold number of people in the geographical area; and
   sending the audio file information to the external instant messaging terminal at the opposite end to trigger the external instant messaging terminal at the opposite end to play an audio file based on the audio file information.

8. The method as described in claim 7, wherein the determining of the instant messaging scenario type comprises:
   retrieving keywords included in instant messaging content information; and
   determining the instant messaging scenario type based on the keywords.

9. The method as described in claim 7, wherein the determining of the instant messaging scenario type comprises:
   retrieving characteristic information of an instant messaging session at the current moment, the characteristic information of the instant messaging session at the current moment including time information, weather information, or breaking news information of the instant messaging session at the current moment; and
   determining the instant messaging scenario type based on the characteristic information of the instant messaging session at the current moment.

10. The method as described in claim 7, further comprising:
    automatically playing the audio file based on the audio file information.

11. A device for playing multimedia files during instant messaging, characterized in that it comprises:
    at least one processor configured to:
       determine an instant messaging scenario type associated with an instant messaging session;
       locate multimedia file information that matches the scenario type, comprising to:
       determine a geographical area in which a first instant messaging terminal and a second instant messaging terminal participating in the instant messaging session are located, the determination being based at least in part on a first geographical location of the first instant messaging terminal and a second geographical location of the second instant messaging terminal participating in the instant messaging session; and
       determine the multimedia file information that matches the scenario type and has a popularity value greater than a preset popularity threshold value that corresponds to a preset threshold number of people in the geographical area; and
       send the multimedia file information to at least one instant messaging terminal of a plurality of instant messaging terminals participating in the instant messaging session to trigger the at least one instant messaging terminal to automatically play a multimedia file based on the multimedia file information, the plurality of instant messaging terminals including the first instant messaging terminal and the second instant messaging terminal; and
    a memory coupled to the at least one processor and configured to provide the at least one processor with instructions.

12. The device as described in claim 11, wherein the determining of the instant messaging scenario type comprises to:

retrieve keywords included in instant messaging content information; and determine the instant messaging scenario type based on the keywords.

13. The device as described in claim 12, wherein the retrieving of the keywords included in the instant messaging content information comprises to:

retrieve the instant messaging content information sent by an instant messaging terminal participating in the instant messaging session; and extract the keywords based on the instant messaging content information.

14. The device as described in claim 12, wherein the retrieving of the keywords included in the instant messaging content information comprises to:

retrieve the keywords included in the instant messaging content information sent by an instant messaging terminal participating in the instant messaging session.

15. The device as described in claim 12, wherein the determining of the instant messaging scenario type based on the keywords comprises to:

determine the instant messaging scenario type based on the keywords in response to a determination that the keywords satisfy preset conditions, wherein the preset conditions comprise:

a number of times the keywords appear in the instant messaging content information being greater than a preset number of times; or a combination of keywords and specified characters appears in the instant messaging content information.

16. The device as described in claim 11, wherein the determining of the instant messaging scenario type comprises to:

retrieve characteristic information of the instant messaging session at the current moment, the characteristic information of the instant messaging session at the current moment includes time information, weather information, or breaking news information of the instant messaging session at the current moment; and determine the instant messaging scenario type based on the characteristic information of the instant messaging session at the current moment.

17. A device for playing multimedia files during instant messaging, characterized in that it comprises:

at least one processor configured to:
determine an instant messaging scenario type;
locate audio file information that matches the scenario type, comprising to:
determine a geographical area in which a local instant messaging terminal and an external instant messaging terminal participating in the instant messaging session are located, the determination being based at least in part on a first geographical location of the local instant messaging terminal and a second geographical location of the external instant messaging terminal participating in the instant messaging session; and
determine the audio file information that matches the scenario type and has a popularity value greater than a preset popularity threshold value that corresponds to a preset threshold number of people in the geographical area; and
send the audio file information to the external instant messaging terminal at the opposite end to trigger the external instant messaging terminal at the opposite end to automatically play an audio file based on the audio file information; and a memory coupled to the at least one processor and configured to provide the at least one processor with instructions.

18. The device as described in claim 17, wherein the determining of the instant messaging scenario type comprises to:

retrieve keywords included in instant messaging content information; and determine the instant messaging scenario type based on the keywords.

19. The device as described in claim 17, wherein the determining of the instant messaging scenario type comprises to:

retrieve characteristic information of an instant messaging session at the current moment, the characteristic information of the instant messaging session at the current moment including time information, weather information, or breaking news information of the instant messaging session at the current moment; and determine the instant messaging scenario type based on the characteristic information of the instant messaging session at the current moment.

20. The device as described in claim 17, wherein the at least one processor is further configured to:

automatically play the audio file based on the audio file information.

21. A computer program product being embodied in a tangible non-transitory computer readable storage medium and comprising computer instructions for:

determining an instant messaging scenario type associated with an instant messaging session;

locating multimedia file information that matches the scenario type; and sending the multimedia file information to at least one instant messaging terminal of a plurality of instant messaging terminals participating in the instant messaging session to trigger the at least one instant messaging terminal to automatically play a multimedia file based on the multimedia file information.

22. A computer program product being embodied in a tangible non-transitory computer readable storage medium and comprising computer instructions for:

determining an instant messaging scenario type;

locating audio file information that matches the scenario type, comprising:

determining a geographical area in which a local instant messaging terminal and an external instant messaging terminal participating in the instant messaging session are located, the determination being based at least in part on a first geographical location of the local instant messaging terminal and a second geographical location of the external instant messaging terminal participating in the instant messaging session; and determining the audio file information that matches the scenario type and has a popularity value greater than a preset popularity threshold value that corresponds to a preset threshold number of people in the geographical area; and sending the audio file information to the external instant messaging terminal at the opposite end to trigger the external instant messaging terminal at the opposite end to play an audio file based on the audio file information.

* * * * *